United States Patent
Minakuchi et al.

(10) Patent No.: US 6,762,266 B2
(45) Date of Patent: Jul. 13, 2004

(54) PHASE RETARDER

(75) Inventors: Keiichi Minakuchi, Niihama (JP); Koji Higashi, Niihama (JP); Nobuo Oi, Narashino (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/123,179

(22) Filed: Apr. 17, 2002

(65) Prior Publication Data

US 2002/0169267 A1 Nov. 14, 2002

(30) Foreign Application Priority Data

May 10, 2001  (JP) ........................................ 2001-139816
Nov. 7, 2001  (JP) ........................................ 2001-341625

(51) Int. Cl.[7] ........................... C08F 232/04; G02B 5/30
(52) U.S. Cl. ........................ 526/308; 526/281; 526/282; 526/916; 359/500
(58) Field of Search ................................ 526/308, 916, 526/281, 282; 359/500

(56) References Cited

U.S. PATENT DOCUMENTS 5,061,042 A * 10/1991 Nakamura et al. ............. 359/63
6,063,886 A *  5/2000 Yamaguchi et al. .......... 526/282
6,346,578 B2     2/2002 Arakawa

FOREIGN PATENT DOCUMENTS

| JP | 2000-137116 A | 5/2000 |
| JP | 2001-208913 A | 8/2001 |
| JP | 2001-235622 A | 8/2001 |
| JP | 2001-249222 A | 9/2001 |

* cited by examiner

*Primary Examiner*—Fred Teskin
(74) *Attorney, Agent, or Firm*—Sughrue Mion, PLLC

(57) ABSTRACT

The present invention provides a phase retarder made of a copolymer prepared by polymerizing one non-cyclic olefin monomer (A) selected from ethylene and α-olefin compound having 3 to 20 carbon atoms, one cyclic olefin monomer (B) selected from cyclic olefin compound such as norbornene, and one cyclic vinyl monomer (C) selected from vinyl compound having a cyclic unit made of an aromatic hydrocarbon or an alicyclic hydrocarbon such as styrene or vinylcyclohexane; wherein (1) an amount of the aromatic vinyl monomer is from about 1 to about 20 mol % and a total amount of the non-cyclic olefin monomer (A) and the cyclic olefin monomer (B) is from about 80 to about 99 mol % in case the component (C) is the aromatic vinyl monomer, or (2) an amount of the alicyclic vinyl monomer is from about 80 to about 99 mol % and a total amount of the non-cyclic olefin monomer and the cyclic olefin monomer is from about 1 to about 20 mol % in case the component (C) is the alicyclic vinyl monomer. The present phase retarder makes it possible to conduct uniform polarizing conversion within a wide wavelength range using a single plate.

3 Claims, No Drawings

PHASE RETARDER

BACKGROUND OF THE INVENTION

1. Field of the Invention

The present invention relates to a phase retarder that makes it possible to conduct uniform polarizing conversion in a wide wavelength range using a single phase retarder.

2. Description of the Related Art

Commonly used phase retarders are obtained by monoaxial stretching or biaxial stretching of thermoplastic resins such as polycarbonate, polyallylate, polystyrene, polyvinyl alcohol, norbornene resin and the like. When a ratio ($R_{450}/R_{590}$) of retardation at light having a wavelength of 450 nm ($R_{450}$) to retardation at light having a wavelength of 590 nm ($R_{590}$) is defined as a wavelength dispersion coefficient $\alpha$, the wavelength dispersion coefficient $\alpha$ of a phase retarder obtained from these thermoplastic resins is about 1.00 or more. The wavelength dispersion coefficient $\alpha$ is a value peculiar to a substance.

In order to conduct uniform polarizing conversion within a wide wavelength range using a polarizing conversion element such as phase retarder, the wavelength dispersion coefficient $\alpha$ is preferably less than about 1.00. An ideal phase retarder generates retardation so that a ratio of retardation to wavelength has a constant value, for example ¼ or ½, at any wavelength. In other words, a value determined by dividing retardation at each wavelength by its wavelength is constant in an ideal phase retardation film. Therefore, an ideal wavelength dispersion coefficient $\alpha$ of the phase retarder is 450/590 (nearly equal 0.76).

To attain such wavelength dispersion properties, Japanese Unexamined Patent Publication (Kokai) No. 2-120804 proposes to laminate two phase retarders having different wavelength dispersion properties, while Japanese Unexamined Patent Publication (Kokai) No. 5-100114 proposes to laminate a λ/2 plate and a λ/4 plate. However, in case two or more phase retarders are laminated, the cost increases and the thickness inevitably increases, and also there was a problem such as large angle dependence of optical properties.

SUMMARY OF THE INVENTION

Accordingly, it is an object of the present invention to provide a phase retarder that makes it possible to conduct uniform polarizing conversion within a wide wavelength range using a single phase retarder.

As a result of diligent research, the present inventors have found that a phase retarder, that can achieve the object described above, can be obtained by stretching a polymer prepared by copolymerizing three kinds of monomers in a composition ratio within a range as described herein. Thus, the present invention has been completed.

That is, the present invention provides a phase retarder comprising a copolymer prepared by polymerizing the following components (A), (B) and (C):

(A) at least one non-cyclic olefin monomer selected from ethylene and α-olefin compound having 3 to 20 carbon atoms;
(B) at least one cyclic olefin monomer selected from cyclic olefin compound; and
(C) at least one aromatic vinyl monomer selected from vinyl compound having a cyclic unit made of an aromatic hydrocarbon, or at least one alicyclic vinyl monomer selected from vinyl compound having a cyclic unit made of an alicyclic hydrocarbon;

wherein (1) the amount of the aromatic vinyl monomer is from about 1 to about 20 mol % and the total amount of the non-cyclic olefin monomer (A) and the cyclic olefin monomer (B) is from about 80 to about 99 mol % in case the component (C) is the aromatic vinyl monomer; or (2) the amount of the alicyclic vinyl monomer is from about 80 to about 99 mol % and the total amount of the non-cyclic olefin monomer (A) and the cyclic olefin monomer (B) is from about 1 to about 20 mol % in case the component (C) is the alicyclic vinyl monomer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The present invention will now be described in detail. In the phase retarder produced by stretching and orienting a copolymer comprising a repeating unit of a monomer having a positive polarizability and a repeating unit of a monomer having a negative polarizability, retardations originating in each repeating unit offset each other and the retardation of the copolymer becomes a difference in retardation originating in each repeating unit Therefore, the wavelength dispersion properties of the copolymer are decided by wavelength dispersion properties of each repeating unit and magnitude of the retardation of the component originating in each repeating unit. Thus, wavelength dispersion can be controlled with introducing repeating units having different polarizabilities and wavelength dispersions in the polymer.

The role of the repeating unit originating in each of the non-cyclic olefin monomer (A), the cyclic olefin monomer (B), and the aromatic vinyl monomer or alicyclic vinyl monomer (C) as components of the polymer constituting the phase retarder of the present invention will now be described concretely. It is considered that the repeating unit originating in the non-cyclic olefin monomer (A) has the role of imparting the flexibility to the polymer and, moreover, the polarizability is positive to the direction of a main chain of the polymer and the wavelength dispersion coefficient $\alpha A$ is considered to be nearly equal 1.00. It is considered that the repeating unit originating in the cyclic olefin monomer (B) has the role of improving the heat resistance of the polymer and, moreover, the polarizability is generally positive to the direction of a main chain of the polymer and the wavelength dispersion coefficient $\alpha_B$ is considered to be nearly equal 1.00. It is considered that the repeating unit originating in the aromatic or alicyclic vinyl compound (C) having a cyclic unit made of an aromatic or alicyclic hydrocarbon has the role of improving the transparency to the polymer and, moreover, the polarizability is negative to the direction of a main chain of the polymer and the wavelength dispersion coefficient $\alpha_C$ is considered to be 1.00 or more. Proper control of a copolymerization ratio of the non-cyclic olefin monomer (A), the cyclic olefin monomer (B), and the aromatic or alicyclic vinyl monomer (C) makes it possible to design a copolymer having excellent balance between the flexibility, transparency, heat resistance and wavelength dispersion properties.

With respect to a component ratio of the repeating unit originating in the non-cyclic olefin monomer (A), the repeating unit originating in the cyclic olefin monomer (B) and the repeating unit originating in the vinyl monomer (C) having a cyclic unit in the copolymer, the amount of the repeating unit originating in the aromatic vinyl monomer is about 1 to about 20 mol % and the total amount of the repeating unit originating in each of the non-cyclic olefin monomer (A) and the cyclic olefin monomer (B) is about 80 to about 99 mol % in case the vinyl monomer (C) is the aromatic vinyl monomer. In view of the flexibility and heat resistance, the amount of the repeating unit originating in the cyclic olefin monomer (B) is preferably about 40 mol % or more. The amount of the repeating unit originating in the non-cyclic olefin monomer (A is preferably about 1 mol % or more.

In case the vinyl monomer (C) is the alicyclic vinyl monomer, the amount of the repeating unit originating in the alicyclic vinyl monomer is about 80 to about 99 mol % and the total amount of the repeating unit originating in each of the non-cyclic olefin monomer (A) and the cyclic olefin monomer (B) is about 1 to about 20 mol %. Each amount of the non-cyclic olefin monomer (A) and the cyclic olefin monomer (B) may be preferably selected within a range from about 0.5 to about 19.5 mol %. In view of the flexibility and heat resistance, the amount of the repeating unit originating in the cyclic olefin monomer (B) is preferably about 10 mol % or more. The amount of the repeating unit originating in the non-cyclic olefin monomer (A) is preferably about 1 mol % or more.

When using the aromatic vinyl monomer as the vinyl monomer (C), the amount is about 20 mol % or less based on the whole copolymer because retardation is easy to generate due to large polarizability and a wavelength dispersion coefficient is large. To control the wavelength dispersion coefficient of the copolymer to a proper value, the amount of the aromatic vinyl monomer is preferably about 10 mol % or less. In case the aromatic vinyl monomer is styrene, the amount is preferably about 9 mol % or less. When using the alicyclic vinyl monomer, the amount is about 80 mol % or more based on the whole copolymer because retardation is difficult to generate due to small polarizability and a wavelength dispersion coefficient is small.

The vinyl monomer (C) having a cyclic unit has a function of controlling the wavelength dispersion properties to the phase retarder of the present invention. To obtain a copolymer having α of 0.76, a combination of x, y and z may satisfy the following equations (I) and (II):

$$(\alpha_A x + \alpha_B y) - \alpha_C z = 0.76 R \quad (I)$$

$$(x+y) - z = R \quad (II)$$

where $\alpha_A$, $\alpha_B$ and $\alpha_C$ each denotes a wavelength dispersion coefficient of a polymer made only of a non-cyclic olefin monomer (A), a polymer made only of a cyclic olefin monomer (B), and a polymer made only of a vinyl monomer (C) having a cyclic unit; x, y and z each denotes a retardation at a wavelength of 590 nm of a repeating unit originating in each of the non-cyclic olefin monomer (A), the cyclic olefin monomer (B), and the vinyl monomer (C) having a cyclic Unit; and R denotes a retardation at a wavelength of 590 nm of a phase retarder made from the copolymer.

Since the wavelength dispersion coefficients $\alpha_A$ and $\alpha_B$ of each homopolymer of the non-cyclic olefin monomer (A) and the cyclic olefin monomer (B) used in the present invention are nearly 1.00, a proper copolymerization ratio is decided by the magnitude of the wavelength dispersion coefficients $\alpha_C$ of the vinyl monomer (C) having a cyclic unit. For example, in the case of $\alpha_C$ of 1.10, a copolymerization ratio z: (x+y)=2.4:3.4 is preferable. If the phase retarder is a λ/4 plate, x+y=500 nm and z=353 nm. For example, in the case of $\alpha_C$ of 1.02, a copolymerization ratio z: (x+y)=12:13 is preferable. If the phase retarder is a λ/4 plate, x+z=1,911 nm and y=1,764 nm. As is apparent from these examples, the larger the difference between $\alpha_A$ and $\alpha_C$ and that between $\alpha_B$ and $\alpha_C$, the better because x, y and z are respectively small. That is, it is preferable in view of easy processing of the phase retarder.

The phase retarder of the present invention is preferably made of a polymer, which usually has a glass transition temperature (Tg) of about 100° C. or higher and also has the heat resistance, in view of operating environment. It is more preferable that a polymer has a glass transition temperature of about 140° C. or higher.

The respective monomers constituting the copolymer will now be described. The non-cyclic olefin monomer (A) is ethylene and/or an α-olefin compound having 3 to 20 carbon atoms. Examples of the α-olefin compound having 3 to 20 carbon atoms include straight-chain α-olefin having 3 to 20 carbon atoms, such as propylene, 1-butene, 1-pentene, 1-hexene, 1-octene, 1-decene, 1-dodecene, 1-tetradecene, 1-hexadecene, 1-octadecene or 1-eicosene; and branched α-olefin having 4 to 20 carbon atoms, such as 4-methyl-1-pentene, 3-methyl-1-pentene, or 1-methyl-1-butene. Among these compounds, ethylene having 2 carbon atoms and straight-chain α-olefin having 3 or 4 carbon atoms such as propylene or 1-butene are preferable in view of the flexibility of a film formed from the polymer of the present invention, and ethylene is particularly preferable for the same reason. Ethylene and α-olefins described above may be used alone, or two or more kinds of them may be used in combination.

The cyclic olefin monomer (B) is a compound having a polymerizable carbon-carbon double bond in a carbon ring and a monomer capable of introducing a cyclobutane ring, a cyclopentane ring, a cyclohexane ring, or an alicyclic ring like a ring formed by bonding two or more rings of them into a main chain of the copolymer when copolymerized. Specific examples thereof include norbornene derivative having an alkyl group having 1 to 4 carbon atoms such as methyl group, ethyl group or butyl group introduced therein (which is commonly referred to as norbornene) such as bicyclo [2, 2, 1]hept-2-ene, 6-alkylbicyclo[2, 2, 1]hept-2-ene, 5,6-dialkylbicyclo[2, 2, 1]hept-2-ene, 1-alkylbicyclo[2, 2, 1]hept-2-ene, or 7-alkylbicyclo[2, 2, 1]hept-2-ene; dimethanooctahydronaphthalene derivative having an alkyl group having 3 or more carbon atoms introduced at the 8-position and/or the 9-position of dimethanooctahydronaphthalene (which is commonly referred to as dimethanooctahydronaphthalene) such as tetracyclo[4, 4, 0, $1^{2,5}$, $1^{7,10}$]-3-dodecene, 8-alkyltetracyclo[4, 4, 0, $1^{2,5}$, $1^{7,10}$]-3-dodecene, or 8,9-dialkyltetracyclo[4, 4, 0, $1^{2,5}$, $1^{7,10}$]-3-dodecene; norbornene derivative having one or plural halogens introduced into a molecule; and dimethanooctahydronaphthalene derivative having a halogen introduced at the 8-position and/or the 9-position. These cyclic olefins may be sued alone, or two or more kinds of them may be used in combination.

The vinyl compound having a cyclic unit as the component (C) is prepared by bonding a vinyl group, which forms a main chain by the copolymerization of the non-cyclic olefin monomer (A) and the cyclic olefin monomer (B), with a unit containing a cyclic unit. Specific examples of the cyclic unit include aromatic hydrocarbon group having about 6 to about 14 carbon atoms and alicyclic hydrocarbon group having about 3 to about 12 carbon atoms.

The vinyl compound having an aromatic hydrocarbon group includes styrene and a derivative thereof. The styrene derivative is a compound prepared by bonding styrene with the other group, and examples thereof include alkylstyrene such as o-methylstyrene, m-methylstyrene, p-methylstyrene, 2,4-dimethylstyrene, o-ethylstyrene, or p-ethylstyrene; substituted styrene having a hydroxyl group, an alkoxy group, a carboxyl group, an acyloxy group or a halogen introduced into the benzene nucleus of styrene, such as hydroxystyrene t-butoxystyrene, vinylbenzoic acid, vinylbenzyl acetate, o-chlorostyrene, or p-chlorostyrene; and vinylbiphenyl compound such as 4-vinylbiphenyl or 4-hydroxy-4'-vinylbiphenyl.

The alicyclic hydrocarbon group to be bonded with the vinyl group includes a group derived from a cyclic paraffin having about 3 to about 12 carbon atoms or a derivative thereof, such as cyclopropane, cyclobutane, cyclopentane, cyclohexane, cycloheptane, cyclooctane, cyclodecane, norbornene, or adamantane.

Among the vinyl monomer (C) having such a cyclic unit, a monomer having a unit of the benzene ring as an aromatic hydrocarbon is preferable in view of the wavelength dispersion properties. For example, styrene and a derivative thereof are preferable. The vinyl compounds having a cyclic unit may be used alone, or two or more kinds of them may be used in combination within the aromatic vinyl compound or alicyclic vinyl compound.

The copolymer for phase retarder of the present invention comprises a repeating unit originating in the non-cyclic olefin monomer (A), a repeating unit originating in the cyclic olefin monomer (B), and a repeating unit originating in the vinyl monomer (C) having a cyclic unit. Specific examples of the copolymer include ethylene/norbornene/styrene copolymer, ethylene/dimethanooctahydronaphthalene/styrene copolymer, propylene/norbornene/styrene copolymer, propylene/dimethanooctahydronaphthalene/styrene copolymer, ethylene/norbornene/t-butoxystyrene copolymer, ethylene/norbornene/vinylcyclohexane copolymer, ethylene/dimethanooctahydronaphthalene/vinylcyclohexane copolymer, propylene/norbornene/vinylcyclohexane copolymer, and propylene/dimethanooctahydronaphthalene/vinylcyclohexane copolymer.

The mode of copolymerization in the copolymer may be any copolymerization mode of random copolymerization and block copolymerization as far as the effect of the present invention is not adversely affected. It is preferable to avoid the mode wherein the resulting copolymer exhibits blocking properties that enable three kinds of constituent monomers to form a domain, because the transparency is sometimes lowered.

The copolymer used in the phase retarder of the present invention can be prepared, for example, by copolymerizing a non-cyclic olefin monomer (A), a cyclic olefin monomer (B) and a vinyl monomer (C) having a cyclic unit in the presence of a metallocene catalyst. In that case, copolymers having different copolymerization compositions and molecular weights can be obtained by appropriately varying the amount of the non-cyclic olefin monomer (A), the cyclic olefin monomer (B) and the vinyl monomer (C) having a cyclic unit as well as the polymerization conditions such as polymerization temperature and polymerization time.

These copolymers may contain various additives such as ultraviolet absorbers, antioxidants, lubricants, antistatic agents, antibacterial agent, anti-fogging agents, and plasticizers as far as the effect of the present invention is not adversely affected.

The phase retarder of the present invention is usually produced with forming the copolymer described above into a sheet and stretching the sheet. Although the method of forming into a sheet is not specifically limited, methods such as solvent casting method and melt extrusion method can be employed. Examples of the stretching method include, but are not limited to, transverse stretching by means of the tenter method and longitudinal stretching by means of stretching between rolls.

According to the phase retarder thus obtained, polarizing conversion can be conducted uniformly within a wide wavelength range. In the case of a $\lambda/4$ plate, a circular polarizing plate for wide wavelength range can be made by using in combination with a linear polarizing plate. In the case of a $\lambda/2$ plate, a polarizing rotating element for wide wavelength range can be made by using in combination with a linear polarizing plate. Therefore, the phase retarder can be used in anti-reflection filters for various liquid crystal display devices, cathode ray tubes (CRT), touch panels and electroluminescences (EL), and can also used in liquid crystal projectors.

EXAMPLES

The present invention will be further explained by way of the following Examples, but is not limited thereto.

Example 1

A copolymer prepared by copolymerizing ethylene, styrene and norbornene in a molar ratio of 39:7:54 was formed into a film having a thickness of 110 μm under pressure. The resulting film was monoaxially stretched 1.7 times at 163° C. using an autograph. The resulting phase retarder had a positive polarity and showed $R_{590}$ of 11.1 nm, $R_{450}$ of 8.4 nm and $\alpha$ of 0.76.

Example 2

A copolymer prepared by copolymerizing ethylene, styrene and norbornene in a molar ratio of 40:6:54 was dissolved in toluene and then a film having a thickness of 100 μm was formed. The resulting film was monoaxially stretched 1.4 times at 115° C. using an autograph. The resulting phase retarder had positive polarity and showed $R_{590}$ of 9.1 nm, $R_{450}$ of 8.4 nm and $\alpha$ of 0.92.

Comparative Example 1

A copolymer prepared by copolymerizing ethylene, styrene and norbornene in a molar ratio of 55:0:45 was formed into a film having a thickness of 100 μm under pressure. The resulting film was monoaxially stretched 1.1 times at 160° C. using an autograph. The resulting phase retarder had a positive polarity and showed $R_{590}$ of 5.0 nm, $R_{450}$ of 5.3 nm and $\alpha$ of 1.06.

Comparative Example 2

A copolymer prepared by copolymerizing ethylene, styrene and norbornene in a molar ratio of 46:27:27 was formed into a film having a thickness of 100 μm under pressure. The resulting film was monoaxially stretched 1.7 times at 80° C. using an autograph. The resulting phase retarder had a negative polarity and showed $R_{590}$ of 126.0 nm, $R_{450}$ of 142.7 nm and $\alpha$ of 1.13.

According to the phase retarder of the present invention, uniform polarizing conversion can be conducted within a wide wavelength range using a single plate because a wavelength dispersion coefficient α is less than about 1.00. The phase retarder is cheap and thin, and also has small dependence of optical properties on angle.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A phase retarder made of a copolymer prepared by polymerizing at least one non-cyclic olefin monomer selected from ethylene and α-olefin compound having 3 to 20 carbon atoms, at least one cyclic olefin monomer selected from cyclic olefin compound, and at least one alicyclic vinyl monomer selected from vinyl compound having a cyclic unit made of an alicyclic hydrocarbon, wherein an amount of the alicyclic vinyl monomer is from about 80 to about 99 mol % and a total amount of the non-cyclic olefin monomer and the cyclic olefin monomer is from about 1 to about 20 mol %.

2. The phase retarder according to claim 1, wherein the amount of the cyclic olefin monomer is about 10 mol % or more.

3. The phase retarder according to claim 1 or 2, wherein the non-cyclic olefin monomer is ethylene, propylene or 1-butene.

* * * * *